TIMER 12

TIMING DIAGRAM

INVENTOR.
SAMUEL LUBKIN
BY S.C. Yuter
ATTORNEY.

GATE 122

GATE 122

BUFFER 146

BUFFER 146

PULSE AMPLIFIER 190

PULSE AMPLIFIER 190

RESHAPER 228

DELAY LINE 170

INVENTOR.
SAMUEL LUBKIN
BY S.C. Yuter
ATTORNEY.

United States Patent Office 2,835,807
Patented May 20, 1958

2,835,807

TIMING DEVICE

Samuel Lubkin, Bayside, N. Y., assignor to Underwood Corporation, New York, N. Y., a corporation of Delaware Application September 20, 1955, Serial No. 535,379

13 Claims. (Cl. 250—27)

This invention relates to timing devices and more particularly to timing devices employing pulse signal techniques.

In various branches of the electronics art it is necessary to generate a signal which occurs at some predetermined time interval after the transmission of an earlier signal. For example, the initiation of an event can be designated by a time marker signal which indicates the beginning of a time interval. The same signal can cause the activation of a timing device which at a later time generates a signal indicating that a predetermined period of time has elapsed.

Delay multivibrators are often used in determining time intervals whenever the period of time need only be established with a moderate degree of precision. However, when the measurement of the time interval must be more precise, other techniques such as signal counting can be employed to attain the desired precision.

As an example of the method of signal counting, assume a delay of a given number of microseconds is desired where the delay must be precise to within a microsecond. Such a delay with its associated precision can be acquired by counting a number of pulses having a megacycle repetition rate by one of the known type of pulse counters. When the count reaches the desired number a signal is transmitted. Since this is a digital operation, the maximum error is less than one pulse period or one microsecond.

Cascaded stages of binary counters have been widely employed counting devices. Each binary counter stage is usually a pair of tubes forming one of the numerous variations of the well known Eccles-Jordan flip-flop, where each stage represents a power of two during a counting operation. For example, three cascaded stages of binary counters are capable of counting eight pulses while four cascaded stages can count a maximum of sixteen pulses.

Although cascaded binary counters can perform the desired counting operation, it should be noted that for counts below about one hundred there is a large ratio of active elements (for example, vacuum tubes) to signal count. Thus, five cascaded binary counters are required to count seventeen pulses. Therefore, even a relatively small count for indicating the time interval requires about ten active elements.

It should be noted that the major portion of the cost in electronics equipment is associated with the active elements. In addition, the weakest link in the equipment is usually the active elements. Vacuum tubes, for instance, have a limited life time. It is therefore desirable to minimize the number of active elements associated with signal counting devices.

One method of reducing the number of active elements is by employing "add-one circuits" which use recirculating registers incorporating digital adder circuits. An "add-one circuit" stores the number of the count in binary representation in a recirculating delay line register as a signal pattern. The output of the delay line register is one information signal fed to the adder circuits while a pulse source periodically feeds single pulses as the other information signal. A signal representing the sum is fed from the output of the adder circuits back to the input of the delay line register.

Unfortunately, the single pulses can only be fed into the adder circuits at a precise time corresponding with the entrance of the least significant binary digit of the information signal fed to the adder circuits. The problems associated with this precision requirement restricts the utility of such a timing device. In addition, the arithmetic circuits although less complex than cascaded binary counters are still expensive.

When employing either of the two methods of counting, the cascaded binary counters or the "add-one circuits," it is difficult to obtain time intervals that are not integral multiples of the signal repetition rate thus the use of the apparatus is further restricted.

It is therefore an object of the invention to provide an improved timing device employing signal counting techniques.

It is another object of the invention to provide a signal-counting timing device that is relatively inexpensive and highly reliable.

It is a further object of the invention to provide a signal-counting timing device that is highly precise and capable of indicating any time intervals.

Briefly, in accordance with the invention, apparatus is provided for generating a signal a desired time interval after the occurrence of an initiating signal. The initiating signal is fed to a storage device. The storage device stores the signal for a fixed period of time and then feeds the signal back to the input of the storage device via a first feedback path. After a second period of time, the storage device feeds back a second signal via a second feedback path to its input of the storage device. Both of the feedback signals are thus sequentially stored in the storage device so that the number of signals in the storage device continually increases. A sensing means continuously senses the signals present in the storage device and when the positions of the signals in the storage device are directly related to the desired time interval, the sampling means generates a signal indicating the end of the time interval.

Other objects and the advantages of the invention will be apparent from the following description taken in conjunction with the accompanying drawings wherein.

Figure 3A:
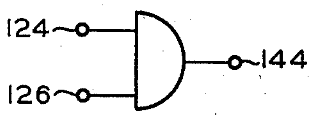

Fig. 3*a* is the symbolic representation of a gate.

Figure 3B:
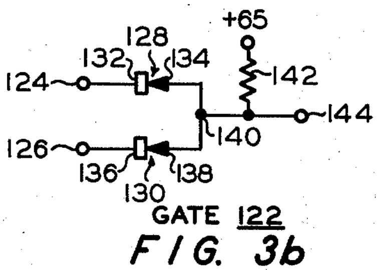

Fig. 3*b* shows the gate of Fig. 3*a* in schematic form.

Figure 4A:
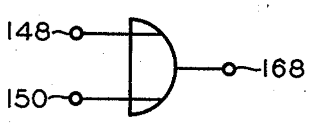

Fig. 4*a* is the symbol used for a buffer.

Figure 4B:
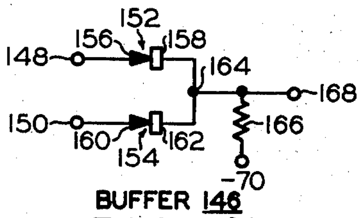

Fig. 4*b* shows schematically the buffer of Fig. 4*a*.

Figure 5A:
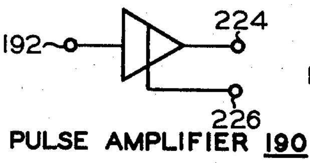

Fig. 5*a* is the symbol used for a pulse amplifier.

Figure 5B:
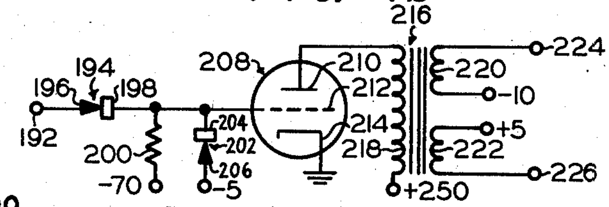

Fig. 5*b* shows the schematic circuit for the pulse amplifier of Fig. 5*a*.

Figure 6A:
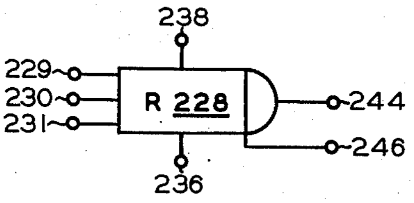

Fig. 6*a* shows symbolically a reshaper.

Figure 6B:
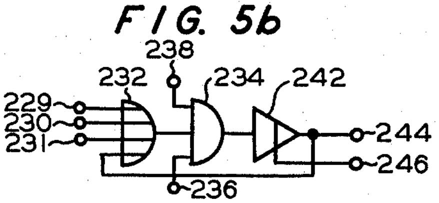

Fig. 6*b* shows the reshaper of Fig. 6*a* using previously-shown symbols.

Figure 7A:
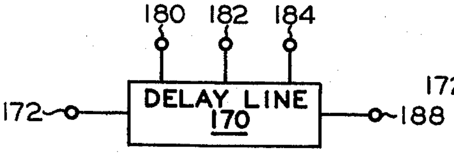

Fig. 7*a* is the symbolic representation of a delay line.

Figure 7B:
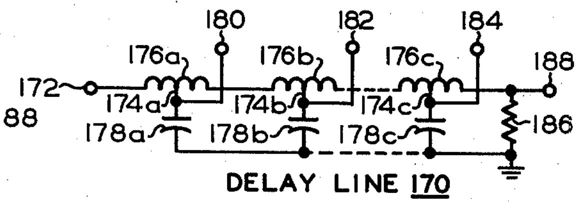

Fig. 7*b* shows the delay line of Fig. 7*a* schematically.

Figure 1:
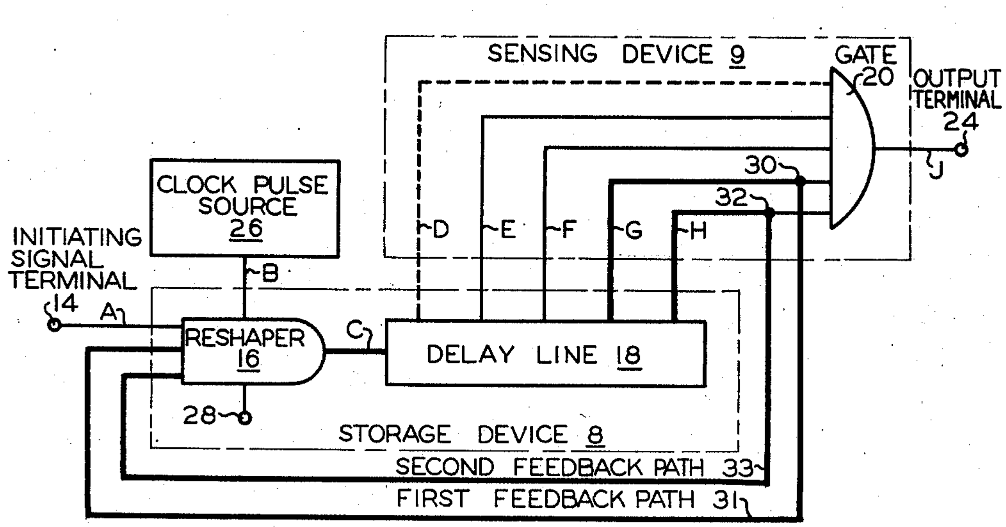
Fig. 1 is a block diagram of a timer for generating a predetermined time interval in accordance with the preferred embodiment of the invention.

Referring to Fig. 1, the timer 12 is provided for indicating a time interval by storing in the storage device 8 a predetermined number of pulses derived from an equiperiodic pulse generator shown as the clock pulse source 26. The pulse positions in the storage device 8 are sensed by the sensing device 9.

An initiating signal is fed to the storage device 8 which is a recirculating delay line register having two feedback paths 31 and 33. The signals in the storage device 8 are fed back via both feedback paths causing an increase in the number of pulses present in the register. The number of pulses stored continues to increase. The contents of the register are continuously sensed by the sensing device 9 for a particular pulse combination indicating the termination of the time interval.

The timer 12 is shown comprising the initiating signal terminal 14, the reshaper 16, the delay line 18, the gate 20, the output terminal 24, the clock pulse source 26, the clear terminal 28, the first feedback path 31 and the second feedback path 33.

The initiating signal terminal 14 is coupled to an input terminal of the reshaper 16 via the line A. The line C links the output terminal of the reshaper 16 to the input terminal of the delay line 18. The lines D, E, F, G, and H connect output terminals or taps of the delay line 18 to input terminals of the gate 20. The output terminal of the gate 20 is coupled via the line J to the output terminal 24 of the timer 12. In addition the lines G and H connect output terminals of the delay line 18 via the junctions 30 and 32 and the first and second feedback paths 31 and 33 to input terminals of the reshaper 16.

The line B couples the output terminal of the clock pulse source 26 to the timing terminal of the reshaper 16. The clear terminal 28 is coupled to a blocking terminal of the reshaper 16.

It should be noted that recirculation or closed loop path are formed comprising the reshaper 16, the line C, the delay line 18, the lines G and H, the junctions 30 and 32 and the first and second feedback paths 31 and 33. The recirculation paths are indicated by the heavy lines.

The reshaper 16 is a regenerative amplifier which functions to reshape and retime positive pulses which have become poorly shaped and attenuated. The reshaper 16 has three input terminals for receiving the poorly shaped pulses. In addition, the reshaper 16 has a timing terminal for receiving clock-pulse signals. The clock-pulse signals cooperate with the poorly shaped pulses to produce full amplitude and precisely timed pulses at the output terminal of the reshaper 16. A detailed description of the reshaper 16 is hereinafter disclosed.

The delay line 18 is an electrical network of the lumped parameter type which functions to delay received pulses for discrete periods of time. In particular, the delay line 18 has a plurality of output terminals or taps which permit varying periods of delay.

The tap coupled to the line D transmits signals delayed three-quarters of a clock pulse period and each successive tap transmits a signal delayed one additional clock pulse period such that signals present on the line H are delayed four and three-quarter clock pulse periods. The delay line 18 will hereinafter be more fully described.

The gate 20 functioning as a sensing device is of the coincidence type which receives input signals via a plurality of input terminals and passes the most negative of the input signals to its output terminal. The gate 20 will hereinafter be more fully described.

The clock-pulse source 26 can be any one of the many square-wave generators common in the art. The repetition rate of the square-wave signals is determined by the timing precision desired. As an example, if the repetition rate is chosen as one hundred and twenty-five kilocycles, a square-wave signal having a period of eight microseconds is obtained and all generated time intervals will have an error not exceeding eight microseconds. However, practical measurement can readily be made with an error not exceeding three microseconds if the repetition rate is one hundred and twenty-five kilocycles.

Figure 2:
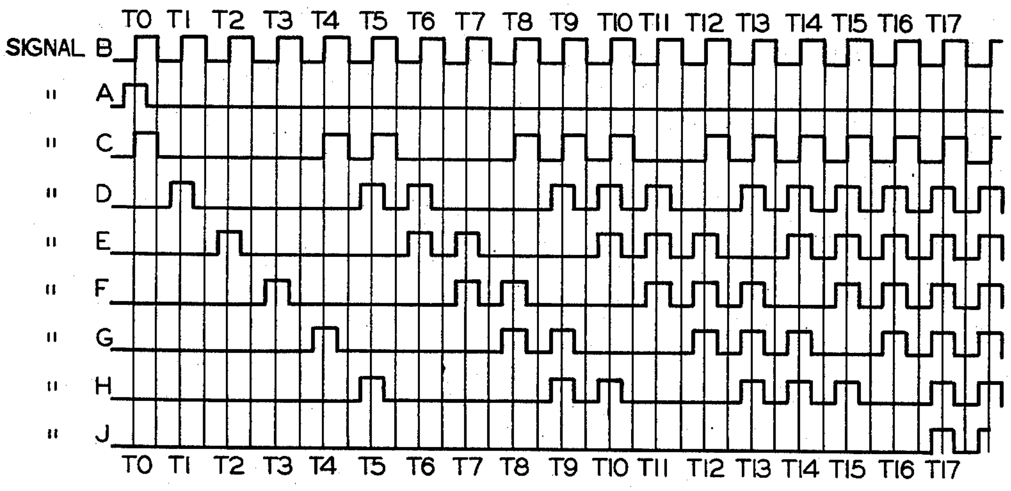
Fig. 2 is a diagram of waveforms associated with the timer of Fig. 1.

Referring to Fig. 2, a series of waveforms of voltage as a function of time are shown. The abscissa is divided into equal clock-pulse periods noted as T0, T1, etc. It should be noted that the signal on the line B is the waveform generated by the clock-pulse source 26. The remaining signals are the potentials of the various lines for a specific example which will now be described by making reference to Fig. 1 and Fig. 2.

Assume a time interval of one hundred and thirty-four microseconds is to be indicated. By counting seventeen clock-pulses having a repetition rate of one hundred and twenty-five kilocycles the desired time interval will be obtained with an error not exceeding eight microseconds.

Before beginning the time measurement, a negative signal is fed via the clear terminal 28 to the blocking terminal of the reshaper 16. The negative signal should have a duration greater than forty microseconds, this being the maximum time any signals can be stored in the delay line 18. At the termination of this signal the timer 12 is ready for operation.

During the time interval T0 an initiation pulse is fed via the initiating signal terminal 14 and the line A to the reshaper 16. The leading edge of the initiation pulse should occur slightly before the start of the T0 time interval and terminate before the start of the T1 time interval (see the signal on the line A of Fig. 2). During the time T0 the signal is reshaped and timed to the clock-pulse source and fed via the line C to the delay line 18. The pulse is transmitted along the delay line 18 and three-quarters of a clock-pulse period after entering the delay line 18 the pulse is present on the line D, one and three-quarter clock-pulse periods after entering the delay line 18 the pulse is present on the line E and two and three-quarter clock-pulse periods after entering the delay line 18 the pulse is present on the line F. Three and three-quarter clock-pulse periods after initial transmission to the delay line 18 the pulse is present on the line G and is fed via the junction 30 and the first feedback path 31 to an input terminal of the reshaper 16. At the time T4 the reshaped feedback pulse is present on the line C.

At the same time, the original pulse is still being transmitted along the line and a quarter of a clock-pulse period before time T5 the pulse is present on the line H. This pulse is fed via the junction 32 and the second feedback path 33 to a second input terminal of the reshaper 16. At the time T5 the reshaper 16 transmits a reshaped pulse via the line C to the delay line 18 and two pulses circulate in the delay line 18.

One-quarter clock-pulse period prior to the time T7, the leading pulse stored in the delay line 18 is present on the line G and is fed back and reshaped in the usual manner. One-quarter clock-pulse period prior to the time T8 the leading pulse is present on the line H and the trailing pulse is present on the line G. Both are fed back in the usual manner but since they occur in coincidence at input terminals of reshaper 16 only one reshaped pulse is transmitted by the reshaper 16 at the time T8.

At one-quarter pulse time prior to the time T9 the second pulse is present on the line H and the pulse is fed back as previously described causing the reshaper 16 to transmit at T9 another pulse to the delay line 16. Thus, at the time T9, three pulses are circulating in the delay line 18.

The operation continues until the delay line 18 is completely filled with pulses. The fill up first occurs one-quarter pulse time before the time T17.

It should be noted that the lines D, E, F, G and H are coupled to taps spaced one clock-pulse period apart on the delay line 18. Thus each "pulse position" of the line is being sensed and when the line is filled a pulse is present in each position. The coincidence of pulses on the lines D, E, F, G and H, each respectively coupled to an input terminal of the gate 20, causes a pulse to pass from the output terminal of the gate 20 via the line J to the output terminal 24. Thus at the time T16 and three-quarters, a pulse is transmitted from the output terminal 24 of the timer 12 indicating the end of the time interval. The total elapsed time between the insertion of the first pulse into the delay line 18 and presence of a pulse at the output terminal 24 is one hundred and thirty-four microseconds. The same time interval is attainable by deleting the line D which has been shown only for the purpose of generalizing the disclosure.

It should be noted that the total elapsed time measured from the leading edge of the initiating pulse to the leading edge of the terminating pulse is slightly greater than 134 microseconds. The additional time may be as much as three microseconds depending upon the original time relationship between the clock-pulse signal entering the reshaper 16 and the signal present at the initiating signal terminal 14. The variation of the time relationship between these two signals is an important factor in limiting the precision of determination of the time interval.

In the illustrated example, seventeen clock-pulse periods is the maximum time interval attainable. The same time interval can be obtained by deleting the line D which has been shown only for the purpose of generalizing the disclosure. Different time intervals may be obtained by modifying the input lines fed to the gate 20. For example, by either changing the number of input lines or by varying the locations of the delay line taps coupled to the input lines. For example, by removing the lines D and H, the time interval is only twelve clock-pulse periods. Another method of changing the time interval is by changing the number of feedback paths and by changing the locations of the delay line taps coupled to the feedback paths.

For measuring longer time intervals, it is necessary to increase the capacity of the storage register. A direct relationship between the capacity of the storage register and the total delay interval has been found, namely:

$$T=P[(n-1)^2+1]$$

where

T=delay interval
P=time of clock pulse period, and
$n$=capacity of storage register in pulses.

For the example cited, $n=5$ (a maximum of five pulses can be stored in the delay line 18) and P was chosen to be eight microseconds; therefore:

$$\begin{aligned}T&=8[(5-1)^2+1]\\&=8\text{ microseconds }(17)\\&=136\text{ microseconds}\end{aligned}$$

When a storage register having a capacity of six pulses is utilized the maximum delay interval is twenty-six clock pulse periods.

Greater time intervals can also be obtained by suitably cascading several of the timing devices or by suitably coupling the output of the apparatus to known types of pulse counters.

In addition, if the timer in being utilized in conjunction with apparatus such as digital computer operating synchronously with a master clock-pulse generator, more precise time intervals are obtainable since both the initiating and output pulses are readily synchronizable to the master clock-pulse generator.

Thus, in accordance with the invention a timer has been provided in which the contents of the storage register are sensed to determine the time interval. The timer utilizes a minimum number of active elements (vacuum tubes), is capable of generating precise time intervals by effectively counting a series of equiperiodically-occurring signals, and can indicate any time interval.

*Description of symbols*

Each of the symbols used in the above disclosure will now be described in detail.

*Gate*

The gates used in the apparatus are of the "coincidence" type, each comprising a crystal diode network which functions to receive input signals via a plurality of input terminals and to pass the most negative signal.

The symbol for a representative gate 122, having two input terminals 124 and 126, is shown in Fig. 3*a*. For illustrative purposes, the signal potential levels are plus five volts (positive signals) and minus ten volts (negative signals), the potentials of the signals which may exist at the input terminals 124 and 126 are thereby limited.

If a potential of minus ten volts is present at one or both of the input terminals 124 and 126, a potential of minus ten volts exists at the output terminal 144. Therefore, if one of the input signals to the input terminals 124 and 126 is positive and the other signal is negative, the negative signal is passed and the positive signal is "blocked."

When there is a coincidence of positive signals at the two input terminals 124 and 126, a positive signal is transmitted from the output terminal 144. In such case, it may be stated that a positive signal is "gated" or "passed" by the gate 122.

The schematic details of the gate 122 are shown in Fig. 3*b*. Gate 122 includes the crystal diodes 128 and 130. Each of the input terminals 124 and 126 is coupled to one of the crystal diodes 128 and 130. Crystal diode 128 comprises the cathode 132 and the anode 134. Crystal diode 130 comprises the anode 138 and the cathode 136. More particularly, the input terminals 124 and 126 are respectively coupled to the cathode 132 of the crystal diode 128 and the cathode 136 of the crystal diode 130. The anode 134 of the crystal diode 128 and the anode 138 of the crystal diode 130 are interconnected at the junction 140. The anodes 134 and 138 are coupled via the resistor 142 to the positive voltage bus 65.

If negative potentials are simultaneously present at the input terminals 124 and 126, both of the crystal diodes 128 and 130 conduct, since the positive supply bus 65 tends to make the anodes 134 and 138 more positive. The voltage at the junction 140 will then be minus ten volts since, while conducting, the anodes 134 and 138 of the crystal diodes 128 and 130 assume the potential of the associated cathodes 132 and 136.

When a positive signal is fed only to the input terminal 124, the cathode 132 is raised to a positive five volts potential and is made more positive than the anode 134, so that crystal diode 128 stops conducting.

As a result, the potential at the junction 140 remains at the negative ten volts level. In a similar manner, when a positive signal is only present at the input terminal 126, the voltage at the junction 140 will not be changed.

When the signals present at both input terminals 124 and 126 are positive, the anodes 134 and 138 are raised to approximately the same potential as their associated cathodes 132 and 136 and the potential at the junction 140 rises to a positive potential of five volts.

The potential which exists at the junction 140 is transmitted from the gate 122 via the connected output terminal 144.

In the above described manner, the gate 122 is frequently used as a switch to govern the passage of one signal by the presence of one or more signals which control the operation of the gate 122.

It should be understood that the potentials of plus five volts and minus ten volts used for purpose of illustration are approximate, and the exact potentials will be affected in two ways. First, they will be affected by the value of the resistance 142 and its relation to the impedances of the input circuits connected to the input terminals 124 and 126. Second, they will be affected by the fact that a crystal diode has some resistance (i. e., is not a perfect conductor) when its anode is more positive than its cathode, and furthermore will pass some current (i. e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 144 to prevent the terminal from becoming more negative than a predetermined voltage level to protect the diodes 128 and 130 against excessive back voltages and to provide the proper voltage levels for succeeding circuits.

*Buffer*

The buffers used in the apparatus are also known as "or" gates. Each buffer comprises a crystal diode network which functions to receive input signals via a plurality of input terminals and to pass the most positive signal.

The symbol for a representative buffer 146, having two input terminals 148 and 150, is shown in Fig. 4*a*. Since the signal potential levels in the system are assumed to be minus ten volts and plus five volts, either one of these potentials may exist at the input terminals 148 and 150.

If a positive potential of five volts exists at one or both of the input terminals 148 or 150, a positive potential of five volts exists at the output terminal 168. If a negative potential of ten volts is present at both of the input terminals 148 and 150, a negative potential of ten volts will be present at the output terminal 168.

The schematic details of the buffer 146 are shown in Fig. 4*b*. The buffer 146 includes the two crystal diodes 152 and 154. The crystal diode 152 comprises the anode 156 and the cathode 158. Crystal diode 154 comprises the anode 160 and the cathode 162. The anode 156 of the crystal diode 152 is coupled to the input terminal 148. The anode 160 of the crystal diode 154 is coupled to the input terminal 150. The cathodes 158 and 162 of the crystal diodes 152 and 154, respectively, are joined at the junction 164 which is coupled to the output terminal 168, and via the resistor 166 to the negative supply bus 70. The negative supply bus 70 tends to make the cathodes 158 and 162 more negative than the anodes 156 and 160, respectively, causing both crystal diodes 152 and 154 to conduct.

When negative ten volt signals are simultaneously present at input terminals 148 and 150, the crystal diodes 152 and 154 are conductive, and the potential at the cathodes 158 and 162 approaches the magnitude of the potential at the anodes 156 and 160. As a result, a negative potential of ten volts appears at the output terminal 168.

If the potential at one of the input terminals 148 or 150 increases to plus five volts, the potential at the junction 164 approaches the positive five volts level as this voltage is passed through the conducting crystal diode 152 or 154 to which the voltage is applied. The other crystal diode 152 or 154 stops conducting since its anode 156 or 160 becomes more negative than the junction 164. As a result, a positive potential of five volts appears at the output terminal 168.

If positive five volt signals are fed simultaneously to both input terminals 148 and 150, a positive potential of five volts appears at the output terminal 168, since both crystal diodes 152 and 154 will remain conducting. Thus the buffer 146 functions to pass the most positive signal received via the input terminals 148 and 150.

*Pulse amplifier*

The symbol for a representative pulse amplifier is shown in Fig. 5*a*. When a positive pulse is fed to the pulse amplifier 190 via the input terminal 192, the pulse amplifier 190 functions to transmit a positive pulse which swings from minus ten to plus five volts from its positive output terminal 224, and a negative pulse which swings from plus five to minus ten volts from its negative output terminal 226. At all other times, the pulse amplifier 190 has a negative potential of ten volts at its positive output terminal 224 and a positive potential of five volts at its negative ouput terminal 226.

The detailed circuitry of the pulse amplifier 190 is shown in Fig. 5*b*. The pulse amplifier 190 includes the vacuum tube 208, the pulse transformer 216 and associated circuitry. The vacuum tube 208 comprises the cathode 214, the grid 212 and the anode 210. The pulse transformer comprises the primary winding 218 and the secondary windings 220 and 222.

The crystal diode 194 couples the grid 212 of the vacuum tube 208 to the input terminal 192, the anode 196 of the crystal diode 194 being coupled to the input terminal 192, and the cathode 198 being coupled to the grid 212. The negative supply bus 70 is coupled to the grid 212 via the resistor 200 and tends to make the crystal diode 194 conductive. The grid 212 and the cathode 198 of the crystal diode 194 are also coupled to the cathode 204 of the crystal diode 202, whose anode 206 is coupled to the negative supply bus 5. The crystal diode 202 clamps the grid 212 at a potential of minus five volts thus preventing the voltage applied to the grid 212 from becoming more negative than minus five volts.

When a voltage more positive than minus five volts is transmitted to the input terminal 192, the crystal diode 194 conducts and the voltage is applied to the grid 212. Since the crystal diode 202 clamps the grid 212 and the cathode 198 of the crystal diode 194 at minus five volts, any voltage more negative than minus five volts will cause the crystal diode 194 to become nonconductive, and that input voltage will be blocked at the crystal diode 194. Thus, the clamping action of the crystal diode 202 will not affect the circuitry which supplies the input voltage.

The cathode 214 of the vacuum tube 208 is connected to ground potential. The anode 210 of the vacuum tube 208 is coupled by the primary winding 218 of the pulse transformer 216 to the positive supply bus 250. The outer ends of the secondary windings 220 and 222 of the pulse transformer 216 are coupled respectively to the positive output terminal 224 and the negative output terminal 226. The inner ends of the secondary windings 220 and 222 are coupled respectively to the negative supply bus 10 and the positive supply bus 5.

A positive pulse which is fed to the grid 212 of the vacuum tube 208 will be inverted at the primary winding 218 of the pulse transformer 216 which is wound to produce a positive pulse in the secondary winding 220 and a negative pulse in the secondary winding 222. These pulses respectively drive the positive output terminal 224 up to a positive five volts potential and the negative output terminal 226 down to a negative ten volts potential because of the circuit parameters.

When the vacuum tube 208 is non-conducting, the negative ten volts potential is fed through the secondary winding 220 and appears at the positive output terminal 224. At the same time, the positive five volts potential is fed through the secondary winding 222 to the negative output terminal 226. These latter conditions are the normally existing conditions at the output terminals 224 and 226.

*Reshaper*

A reshaper of the type used in the apparatus is an electronic circuit which functions to reshape and retime positive pulses which have become poorly shaped and attenuated.

The symbol for a representative reshaper 228 is illustrated in Fig. 6*a* and comprises one or more input terminals of which the input terminals 229, 230 and 231 are shown, timing terminal 238 which receives reshaping and retiming pulses (also designated clocking or C pulses), positive output terminal 244, negative output terminal 246, and blocking terminal 236 through which signals may be sent to make the reshaper 228 inoperative.

Except when positive pulses are fed to the input terminals 229, 230 and 231 of the reshaper 228, a negative potential of ten volts is present at the positive output terminal 244 and a positive potential of five volts exists at the negative output terminal 246.

When a pulse is fed to the reshaper 228 via any one of the input terminals 229, 230 and 231, the pulse is reshaped by a clock pulse (received via the terminal 238), which is timed to delay the reshaped pulse for one quarter of a pulse time, and is then transmitted from the reshaper 228 via the positive output terminal 244. While the positive pulse is being transmitted from the positive output terminal 244, a negative pulse is transmitted from the negative output terminal 246.

The detailed circuitry of the reshaper 228 is illustrated in Fig. 6*b* in which use is made of logical symbols previously described.

The reshaper 228 comprises the buffer 232, the gate 234 and the pulse amplifier 242 connected in series. A positive pulse which is fed via any one of the input terminals 229, 230 and 231 of the buffer 232 is passed to the gate 234. Signals may also be fed via the blocking terminal 236 to the gate 234 and if the signal is negative, the gate 234 is blocked and the reshaper 228 is inoperative. The blocking terminal 236 is generally absent and if present usually receives a positive signal.

A series of identical clock pulses which are generated in the clock pulse generator, are transmitted to the gate 234 via the clock terminal 238. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 234. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 234, the coinciding clock pulse is gated through to the amplifier 242 and is amplified and causes a positive pulse to be transmitted from the positive output terminal 244, and a negative pulse to be transmitted from the negative output terminal 246 at the same time.

The positive output terminal 244 is also coupled to one input of the buffer 232 so that a positive signal which appears at the positive output terminal 244 is regenerative and will continue to exist until the clock pulse terminates at the gate 234. This effectively permits the entire clock pulse to be gated through the gate 234, even though the original pulse has decayed before the end of the clock pulse.

Stated more generally, a clock pulse is passed through the gate 234 from the earliest coincidence of that clock pulse with the full magnitude of the attenuated pulse until the termination of that clock pulse. As a result, a clock pulse is substituted for the attenuated pulse in the system after a delay of one-quarter of a pulse time.

*Delay line*

The symbol for a representative electrical delay line 170 which is a lumped parameter type delay line and which functions to delay received pulses for discrete periods of time, is shown in Fig. 7*a*.

The delay line 170 comprises the input terminal 172, the output terminal 188, and a plurality of taps 180, 182 and 184. A pulse which is fed via the input terminal 172 to the delay line 171 will be delayed for an increasing number of pulse times before successively appearing at the taps 180, 182 and 184. When the pulse reaches the output terminal 188, the total delay provided by the delay line 171 has been applied. In the preceding text, the specific number of pulse-times delay which is encountered before a pulse travels from the input terminal to a tap of the delay line has been stated.

The delay line 170 shown in Fig. 7*b* comprises a plurality of inductors 176 connected in series, with the associated capacitors 178 which couple a point 174 on each inductor 176 to ground. A signal is fed into the delay line 170 at the input terminal 172 and the maximum delay occurs at the output terminal 188. The taps 180, 182 and 184 are each connected to one of the points 174 and provide varied delays. The delay line 170 is terminated by a resistor 186 in order to prevent reflections. Although in the delay line of Fig. 7*b* a tap is shown connected to each of the points 174, it should be understood that in actual practice there are ordinarily several untapped points 174 between successive taps.

There will now be obvious to those skilled in the art many modifications and variations utilizing the principles set forth and realizing many or all of the objects and advantages of the circuits described but which do not depart essentially from the spirit of the invention.

What is claimed is:

1. A timing device for indicating a time interval comprising a storage means responsive to a signal indicating the initiation of said time interval, and two feedback means for feeding back to said storage means two signals for each stored signal, and sensing means responsive to said storage means to detect for predetermined combinations of signals stored in said storage means for indicating the termination of the time interval.

2. A timing device for indicating a time interval comprising a storage means for temporarily storing pulses, said storage means having a plurality of input terminals and output terminals, one of said input terminals being responsive to a signal indicating the initiation of said time interval, and at least two of said output terminals coupled to two of said input terminals to form two feedback paths for feeding back to the input of said storage means two pulses, one pulse via each feedback path, for each stored pulse, and sensing means responsive to said storage means to detect predetermined combinations of pulses stored in said storage means for generating a pulse indicating the termination of the time interval.

3. A time interval indicator responsive to an initiation signal for generating a termination signal at the end of a predetermined time interval comprising storage means for temporarily storing signals, said storage means having two feedback paths for transferring stored signals from the output to the input of said storage means such that each signal stored in said storage means generates two feedback signals, one via each feedback path, to increase the number of stored signals, and sensing means coupled to said storage means for sampling the number of signals stored in said storage means, said sensing means generating a termination signal when a predetermined number of signals are sensed.

4. A time interval indicator responsive to an initiating pulse for generating a termination pulse at the end of a predetermined time interval comprising storage means having a plurality of input terminals and output terminals for temporarily storing pulses received by said input terminals, said storage means having one input terminal responsive to an initiating pulse and having two other of said input terminals coupled respectively to two of said output terminals for providing at least two feedback paths, said feedback paths transferring stored pulses from said output terminals to said input terminals such that each pulse stored in said storage means generates two pulses which are fed back to said storage means for increasing the number of pulses stored in said storage means, and sensing means coupled to said output terminals for sampling the number of pulses stored in said storage means, said sensing means generating a termination pulse when a predetermined number of pulses are sensed as being present in said storage means.

5. A time interval indicator responsive to an initiating pulse for generating a termination pulse at the end of a predetermined time interval comprising storage means for temporarily storing more than one pulse received by said input terminals, said storage means having a plurality of input terminals and output terminals, one of said input terminals receiving the initiating pulse, two other of said input terminals coupled respectively to two of said output terminals for providing at least two feedback paths, said feedback paths transferring after a period of time stored pulses from said output terminals to said input terminals such that each pulse stored in said storage means causes at least two pulses to be fed back, one via each of said feedback paths, to said storage means for increasing the number of pulses stored in said storage means, and sensing means coupled to said output terminals for sampling the number of pulses stored in said storage means, said sensing means generating a termination signal when a predetermined number of pulses are simultaneously sensed in said storage means.

6. Apparatus for generating a signal a predetermined time interval after the receipt of an initiating signal comprising an amplifier having an output terminal and three input terminals, one input terminal of said amplifier being responsive to said initiating signal, a delay means having an input terminal coupled to the output terminal of said amplifier and two output terminals respectively coupled to the other two input terminals of said amplifier to form a register such that for each signal transmitted by said amplifier to said delay means two signals are transmitted back to said amplifier, and sensing means coupled to said register for sensing predetermined signals in said register, the occurrence of said predetermined signals indicating the end of the predetermined time interval.

7. Apparatus for generating a pulse a predetermined time interval after the receipt of an initiating pulse comprising a regenerating amplifier having an output terminal and three input terminals, one input terminal of said regenerating amplifier being responsive to said initiating pulse, a delay means having an input terminal coupled to the output terminal of said regenerating amplifier and two output terminals respectively coupled to two of the input terminals of said regenerating amplifier to form a register such that for each pulse transmitted by said regenerating amplifier to said delay means two pulses are transmitted back to said regenerating amplifier, and sensing means responsive to said delay means for sensing predetermined pulses in said register, the occurrence of said predetermined pulses indicating the end of the predetermined time interval.

8. Apparatus for generating a pulse a predetermined time interval after the receipt of an initiating pulse comprising an amplifier having an output terminal and three input terminals, one of the input terminals of said amplifier being responsive to said initiating pulse, a delay means having an input terminal coupled to the output terminal of said amplifier and a plurality of output terminals, two of the output terminals of said delay means respectively coupled to two of the input terminals of said amplifier to form a storage register having two feedback paths such that for each pulse fed by said amplifier to said delay means two pulses are sequentially fed back, one via each of said feedback paths, after a period of time to said amplifier, and sensing means coupled to output terminals of said delay means for continuously sensing predetermined pulses in said register, the simultaneous occurrence of said predetermined pulses indicating the end of the predetermined time interval.

9. Apparatus responsive to an initiating signal for indicating a predetermined time interval measured from the occurrence of the initiating signal comprising a pulse-forming means for shaping received signals, said pulse-forming means having a plurality of input terminals and an output terminal, one of said input terminals receiving the initiating signal, a storage means for temporarily storing a plurality of pulses, said storage means having an input terminal and a plurality of output terminals, the output terminal of said pulse-forming means being coupled to the input terminal of said storage means for transmitting pulses from said pulse-forming means to said storage means, at least two feedback links for coupling two of the output terminals of said storage means to two of the input terminals of said pulse-forming means for transmitting two signals to said pulse-forming means for each pulse stored in said storage means causing the number of pulses stored in said storage means to periodically increase, and a coincidence circuit having a plurality of input terminals and an output terminal, each of the input terminals of said coincidence circuit being respectively coupled to an output terminal of said storage means for permitting the continuous sampling of pulses present in said storage means such that when a predetermined number of pulses are simultaneously present in said storage means a signal is transmitted from the output terminal of said coincidence circuit indicating the termination of the time interval.

10. Apparatus responsive to an initiating signal for indicating a predetermined time interval measured from the occurrence of the initiating signal comprising a reshaping means for shaping received signals, said reshaping means having a plurality of input terminals and an output terminal, one of said input terminals receiving the initiating signal, a delay means for temporarily storing a plurality of signals, said delay means having an input terminal and a plurality of output terminals, the output terminal of said reshaping means being coupled to the input terminal of said delay means for transmitting shaped signals from said reshaping means to said delay means, at least two feedback means for coupling two of the output terminals of said delay means to two of the input terminals of said reshaping means for transmitting two signals to said reshaping means for each signal stored in said delay means causing the number of signals stored in said delay means to periodically increase, and a sensing means having a plurality of input terminals and an output terminal, each of the input terminals of said sensing means being respectively coupled to an output terminal of said delay means for permitting the simultaneous sensing of signals present in said delay means such that when a predetermined number of signals are present in said delay means a signal is transmitted from the output terminal of said sensing means indicating the termination of the time interval.

11. Apparatus responsive to an initiating signal for indicating a predetermined time interval measured from the occurrence of the initiating signal comprising a pulse-forming amplifier for shaping and amplifying received signals, said pulse-forming amplifier having a plurality of input terminals and an output terminal, one of said input terminals receiving the initiating signal, a delay means for temporarily storing a plurality of pulses, said delay means having an input terminal and a plurality of output terminals, the output terminal of said pulse-forming amplifier being coupled to the input terminal of said delay means for transmitting pulses from said pulse-forming amplifier to said delay means, at least two feedback links for coupling two of the output terminals of said delay means to two of the input terminals of said pulse-forming amplifier for transmitting two signals to said pulse-forming amplifier for each pulse stored in said delay means to cause the number of pulses stored in said delay means to periodically increase, and a coincidence circuit having a plurality of input terminals and an output terminal, each of the input terminals of said coincidence circuit being respectively coupled to an output terminal of said delay means for permitting the continuous sampling of pulses present in said delay means such that when a predetermined number of pulses are simultaneously present in said delay means a signal is transmitted from the output terminal of said coincidence circuit indicating the termination of the time interval.

12. Apparatus responsive to an initiating signal for indicating a predetermined time interval measured from the occurrence of the initiating signal comprising a clock-pulse source, a reshaping amplifier responsive to said clock-pulse source for timing and shaping received signals, said reshaping amplifier having a plurality of input terminals and an output terminal, one of said input terminals receiving said initiating signal, a delay line for temporarily storing a plurality of signals in a temporal distribution, said delay line having an input terminal and a plurality of output terminals, the output terminal of said reshaping amplifier being coupled to the input terminal of said delay line for transmitting shaped and timed signals from said reshaping amplifier to said delay line, at least two feedback links for coupling two of the output terminals of said delay line to two of the input terminals of said reshaping amplifier for transmitting two signals to said reshaping amplifier for each signal stored in said delay line to cause the number of signals stored in said delay line to increase and a gate having a plurality of input terminals and an output terminal, each of the input terminals of said gate being respectively coupled to an output terminal of said delay line for permitting the simultaneous sensing of signals present in said delay line such that when a predetermined number of signals are sensed by said gate a signal is transmitted from the output terminal of said gate indicating the termination of the time interval.

13. Apparatus responsive to an initiating signal for indicating a predetermined time interval measured from the occurrence of the initiating signal comprising a clock-pulse source, a reshaper responsive to said clock-pulse source for shaping and timing received signals, said reshape having a plurality of input terminals and an output terminal, one of said input terminals receiving the initiating signal, a delay line for temporarily storing a plurality of pulses, said delay line having an input terminal and a plurality of output terminals, the output terminal of said reshaper being coupled to the input terminal of said delay line for transmitting pulses from said reshaper to said delay line, at least two feedback links for coupling two of the output terminals of said delay line to two of the input terminals of said reshaper for transmitting two signals to said reshaper for each pulse stored in said delay line causing the number of pulses stored in said delay line to periodically increase, and a gate having a plurality of input terminals and an output terminal, each of the input terminals of said gate being respectively coupled to an output terminal of said delay line for permitting the continuous sampling of pulses present in said delay line such that when a predetermined number of pulses are simultaneously present in said delay line a signal is transmitted from the output terminal of said gate indicating the termination of the time interval.

References Cited in the file of this patent

UNITED STATES PATENTS

| | | |
|---|---|---|
| 2,482,974 | Gordon | Sept. 27, 1949 |
| 2,646,501 | Eckert et al. | July 21, 1953 |
| 2,673,293 | Eckert et al. | Mar. 23, 1954 |
| 2,749,034 | Williams et al. | June 5, 1956 |